United States Patent
Joshi et al.

(10) Patent No.: US 12,050,100 B2
(45) Date of Patent: Jul. 30, 2024

(54) ESTIMATION OF THE TRAILER POSITION RELATIVE TO TRUCK POSITION AND ARTICULATION ANGLE BETWEEN TRUCK AND TRAILER USING AN ELECTROMAGNETIC OR OPTICAL SENSOR

(71) Applicant: WABCO GMBH, Hannover (DE)

(72) Inventors: Kaustubh Joshi, Duesseldorf (DE); Richard Matthaei, Hameln (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 760 days.

(21) Appl. No.: 17/258,467

(22) PCT Filed: Jun. 19, 2019

(86) PCT No.: PCT/EP2019/066263
§ 371 (c)(1),
(2) Date: Jan. 7, 2021

(87) PCT Pub. No.: WO2020/011505
PCT Pub. Date: Jan. 16, 2020

(65) Prior Publication Data
US 2022/0136823 A1   May 5, 2022

(30) Foreign Application Priority Data
Jul. 12, 2018   (DE) .................. 10 2018 116 854.3

(51) Int. Cl.
*G01B 11/26* (2006.01)
*B60W 40/105* (2012.01)
*B60W 40/114* (2012.01)
*B60W 40/12* (2012.01)
*G01S 7/481* (2006.01)
*G01S 17/08* (2006.01)

(52) U.S. Cl.
CPC .......... *G01B 11/26* (2013.01); *B60W 40/105* (2013.01); *B60W 40/114* (2013.01);
(Continued)

(58) Field of Classification Search
CPC ... G01B 11/26; B60W 40/105; B60W 40/114; B60W 40/12; B60W 2300/145;
(Continued)

(56) References Cited

U.S. PATENT DOCUMENTS 9,211,889 B1   12/2015   Hoetzer et al.
10,279,803 B2   5/2019   Lavoie et al.
(Continued)

FOREIGN PATENT DOCUMENTS

CN   103204147 A   7/2013
CN   103963782 A   8/2014
(Continued)

OTHER PUBLICATIONS

DE102012016708A1 machine translation (Year: 2012).*

*Primary Examiner* — Tyler J Lee
*Assistant Examiner* — Yufeng Zhang
(74) *Attorney, Agent, or Firm* — LEYDIG, VOIT & MAYER, LTD.

(57) ABSTRACT

A method for estimating a position of a trailer relative to a truck of a road train includes providing or obtaining a kinematic model of the road train, providing or obtaining a length estimation of the trailer, and measuring an articulation angle between the truck and the trailer. The method further includes determining a position of the trailer relative to the truck using the kinematic model, the length estimation, and the measured articulation angle.

15 Claims, 6 Drawing Sheets

(52) U.S. Cl.
CPC ........... *B60W 40/12* (2013.01); *G01S 7/4817* (2013.01); *G01S 17/08* (2013.01); *B60W 2300/145* (2013.01); *B60W 2420/408* (2024.01); *B60W 2520/10* (2013.01); *B60W 2520/12* (2013.01); *B60W 2520/14* (2013.01); *B60W 2520/22* (2013.01)

(58) Field of Classification Search
CPC ......... B60W 2420/52; B60W 2520/10; B60W 2520/12; B60W 2520/14; B60W 2520/22; B60W 40/10; B60W 2300/14; B60W 2050/0031; G01S 7/4817; G01S 17/08
See application file for complete search history.

(56) References Cited

U.S. PATENT DOCUMENTS

| | | |
|---|---|---|
| 2005/0055138 A1 | 3/2005 | Lee et al. |
| 2006/0244579 A1 | 11/2006 | Raab |
| 2013/0191000 A1 | 7/2013 | Hahne |
| 2016/0031482 A1 | 2/2016 | Lavoie |
| 2016/0039456 A1* | 2/2016 | Lavoie ................. B62D 15/027 701/41 |
| 2018/0001928 A1 | 1/2018 | Lavoie et al. |
| 2018/0127024 A1 | 5/2018 | Pourrezaei Khaligh et al. |
| 2018/0319438 A1* | 11/2018 | Herzog .................. G06N 20/00 |

FOREIGN PATENT DOCUMENTS

| | | |
|---|---|---|
| CN | 105313963 A | 2/2016 |
| DE | 102012010876 A1 | 11/2012 |
| DE | 102012016708 A1 | 5/2014 |
| DE | 102012022807 A1 | 5/2014 |
| DE | 102015203969 A1 | 9/2015 |
| DE | 102016105916 A1 | 10/2016 |
| DE | 112015002788 T5 | 3/2017 |
| WO | WO 2004109326 A1 | 12/2004 |
| WO | WO 2007143990 A1 | 12/2007 |
| WO | WO 2014037064 A1 | 3/2014 |

* cited by examiner

Kinematical Model — 3

Vy_Component@MountingOfTrailer = Yaw Rate*TrailerMountingPosition_Xcoordinate)

Vx_Component@MountingOfTrailer = Longitudinal Velocity;

Vy_Component@TrailerAxle = Vx_Component@MountingOfTrailer Velocity * sin(Previously Estimated Articulation Angle Between Truck and Trailer) + Vy_Component@MountingOfTrailer * cos(Previously Estimated Articulation Angle Between Truck and Trailer);

Trailer Yaw Rate = (Vy_Component@TrailerAxle / Trailer Length from Axle to Front);

Calculated Articulation Angle Between Truck and Trailer = Previously Estimated Articulation Angle Between Truck and Trailer + (yawRate - Trailer Yaw Rate)*CycleTime;

dθ

Estimator — 40

```
if( abs(Articulation Angle Measured - Estimated Articulation
Angle Between Truck and Trailer) > 0.1 and
VerifiedMeasurementFlag == true)
{
    Previously Estimated Articulation Angle Between
    Truck and Trailer = Articulation Angle Measured
}
``` vθ mθ

Lidar Sensor Based Trailer Detector — 38

FIG. 5

ESTIMATION OF THE TRAILER POSITION RELATIVE TO TRUCK POSITION AND ARTICULATION ANGLE BETWEEN TRUCK AND TRAILER USING AN ELECTROMAGNETIC OR OPTICAL SENSOR

CROSS-REFERENCE TO PRIOR APPLICATIONS

This application is a U.S. National Phase application under 35 U.S.C. § 371 of International Application No. PCT/EP2019/066263, filed on Jun. 19, 2019, and claims benefit to German Patent Application No. DE 10 2018 116 854.3, filed on Jul. 12, 2018. The International Application was published in English on Jan. 16, 2020, as WO 2020/011505 A2 under PCT Article 21(2).

FIELD

The invention relates to a method for estimating a position of a trailer relative to a truck of a road train, a computer program, and a control unit for a road train.

BACKGROUND

The position of a trailer of a road train is important to know for turn assist applications which assist the driver during a turn maneuver and which might indicate the presence of vulnerable road users or other objects in the vicinity of the road train.

In particular when the road train carries out a turn maneuver, the position and how this position changes during the maneuver are critical. A length of the trailer or a length between the distance between a king pin, to which the trailer is mounted on the truck, and a rear axle of the trailer highly influence the position of the trailer. The length also is crucial for the space which is required for carrying out the turn maneuver without colliding with any objects.

While the position of the trailer could be determined by using specific sensors mounted to the trailer, it is often not convenient to adapt a controller or software programs, which are used for turn assist applications for each new trailer towed by the truck.

A known turn assist system, for example, is disclosed in WO 2014/037064 A1. The system disclosed therein has three sensors for monitoring an area to the side of a road train, wherein the sensors are arranged on the trailer of the road train. The sensors monitor the area to the side of the trailer provided with the sensors and, in the direction of travel, in front of the trailer. Based on whether these sensors determine an object, a warning signal is output. A drawback of this system is that the sensors actually need to determine this object. A further drawback is that the warning is output irrespective of the fact whether an actual collision could occur. The potential of a collision is dependent on the length and position of the trailer. Thus, the system disclosed in this document only outputs the warning based on a distance between the sensors on the trailer.

From DE 10 2012 016 708 A1 a system is known which uses a single sensor which projects a measuring area to the side of the road train, to which the road train turns. This measuring area is defined by the angle between the trailer and the truck and the base line of this triangle. In DE 10 2012 016 708 A1 it is disclosed that this system uses the actual size of the road train as e.g. the length of single items and the angle at each turn operation. It is disclosed that this information is transferred to a control unit, however it is not disclosed how this information is being determined.

Further systems for monitoring a region adjacent to a road train are disclosed in DE 10 2012 010 876 A1 and WO 2007/143990 A1.

SUMMARY

In an embodiment, the present invention provides a method for estimating a position of a trailer relative to a truck of a road train. The method includes providing or obtaining a kinematic model of the road train, providing or obtaining a length estimation of the trailer, and measuring an articulation angle between the truck and the trailer. The method further includes determining a position of the trailer relative to the truck using the kinematic model, the length estimation and the measured articulation angle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 provides a detailed overview over the elements of the method; and

DETAILED DESCRIPTION

Figure 1:
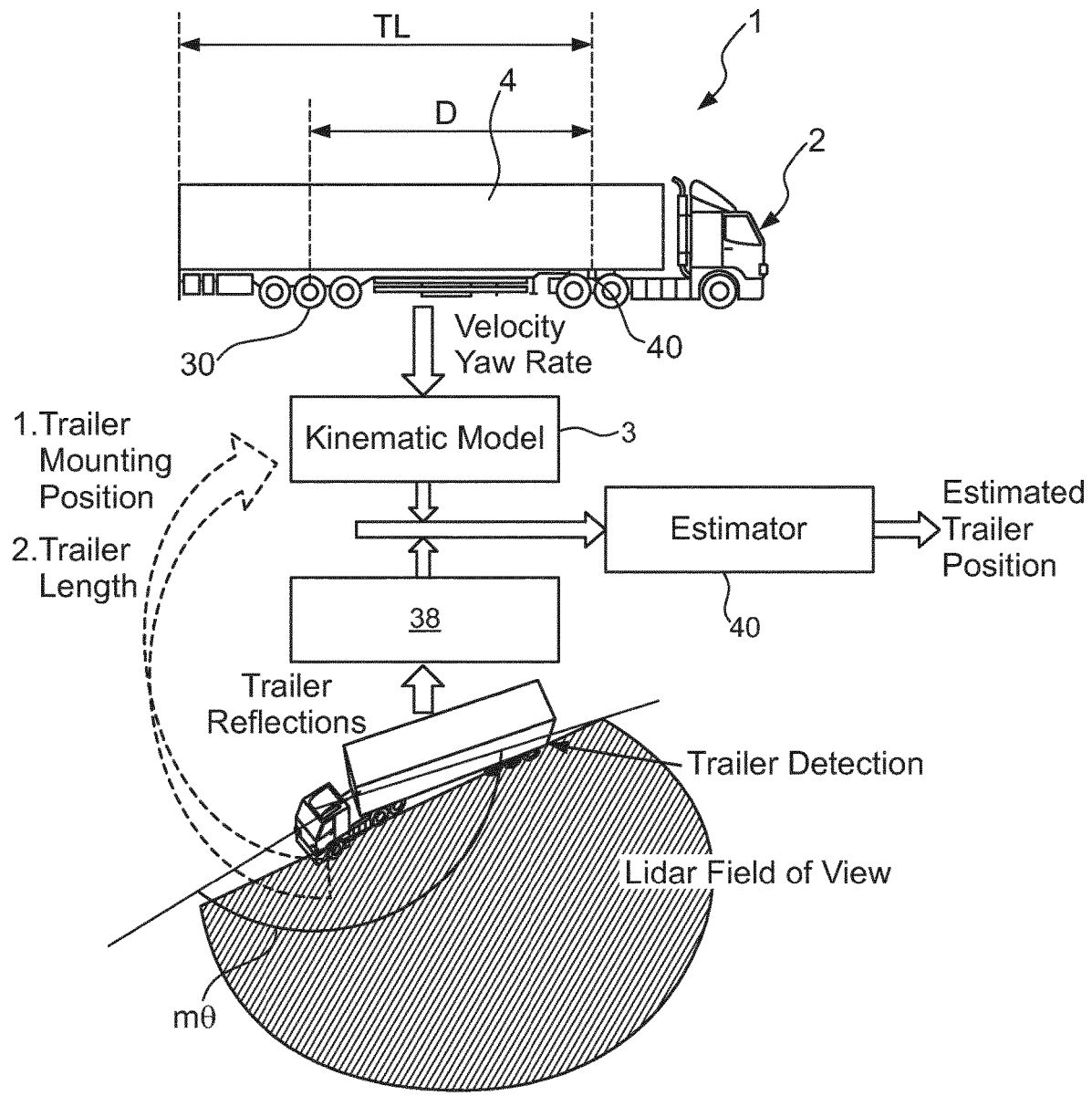
FIG. 1 shows a schematic overview of the basic elements of the method.

The present disclosure, however, describes an automated self-sufficient system and method for estimating the position of the trailer without any additional sensors on the trailer.

Even though the length of the trailer of the road train could theoretically be measured and, in particular, is known, when the road train is always equipped with the same trailer, the position of the trailer is not that easy to be measured. The position of the trailer, however, is crucial, when determining whether the trailer will collide with an object during a turn maneuver.

Therefore, the present disclosure provides a method, a computer program and a control unit which are able to estimate a position of a trailer relative to a truck of a road train, in an easy manner, in particular without any sensors mounted on the trailer.

According to a first aspect, a method for estimating a position of a trailer relative to a truck of a road train includes providing or obtaining a kinematic model of the road train; providing or obtaining a length estimation of the trailer; measuring an articulation angle between the truck and the trailer; and determining a position of the trailer relative to the truck using the kinematic model, the length estimation and the measured articulation angle.

The disclosure is based on the idea that the articulation angle can be measured using sensors mounted on the truck only and further based on the kinematic model and a length estimation, the position of the trailer can be estimated.

The term "estimation" in the present application means that the actual position might slightly deviate from the estimated position, which is determined using specific assumptions, such as, for example, that slip of the tires might be neglected. The fusion of both, a kinematic model, and a measured value, increases quality of the estimation and the kinematic model as well as a measurement may influence each other and may be used to validate the values of the other one of the measurement and determination using a kinematic model. Thus, values which have been calculated or determined based on the kinematic model only can be validated using the measurement and vice versa.

A trailer position measured in a coordinate system of the truck (X direction) can be determined as being the cosine value of the articulation angle multiplied by the length of the trailer. Accordingly, a Y-position might be the sinus value of the articulation angle multiplied by the length of the trailer. Thus, estimation of the trailer position is simple using the above parameters.

The estimated length of the trailer in one embodiment might equal the trailer distance which is the distance between the king pin and the rear axle of the trailer. In other embodiments, the trailer length may be the total length of the trailer, which might be longer than the length between the king pin and the rear axle. The total length might be obtained from a database or determined using a scanner system. This will be described in more detail below.

The method preferably further comprises the steps: obtaining a velocity of the truck, a yaw rate of the truck, and a position of the king pin of the truck; wherein the step of determining a position of the trailer relative to the truck is also based on the velocity of the truck, the yaw rate of the truck, and the position of the king pin of the truck. The velocity of the truck can be directly obtained from sensors in the truck. The same is true for the yaw rate. The position of the king pin usually is known and can be implemented in the kinematic model of the road train. These three values in particular influence how the trailer will behave during a turn maneuver. Therefore, it is beneficial to include these three values in the determination of the position of the trailer.

Moreover, the method preferably comprises: determining a theoretical articulation angle between the truck and the trailer using the kinematic model; comparing the theoretical articulation angle and the measured articulation angle; and correcting the theoretical articulation angle when the measured articulation angle is not within a predetermined tolerance range for the theoretical articulation angle. Thus, according to this embodiment, the method uses the theoretically calculated articulation angle, which can be calculated based on the kinematic model only. However, as in practice also influences as slip of the tires or other influences are present, the actual articulation angle may deviate from the theoretically determined articulation angle. Therefore, the articulation angle also is measured as described below. When the theoretically determined or calculated theoretical articulation angle is not within a preset tolerance range for the theoretical articulation angle, the articulation angle, which is used for the further calculation steps and determination of the position of the trailer, is updated using the measured articulation angle which can mean that it is replaced by this measured articulation angle. Also other fusions of these values are possible, as e.g. using a mean value.

Preferably, the step of measuring the articulation angle between the truck and the trailer is carried out using an electromagnetic wave based measurement between the truck and the trailer.

Preferably, the electromagnetic wave based measurement comprises at a first time: sending a beam from a scanner unit from a side portion of the truck, in particular a co-driver side of the truck, to a measurement point at a side portion of the trailer; receiving at the scanner unit a reflected beam; determining the distance between the scanner unit and the measurement point based on the runtime measurement of the reflected beam. Such a measurement in general is known in the state of the art and has widely been tested. Preferably, these steps are repeated at a second time; and the yaw rate of the trailer is determined based on the change in distance from the first time to the second time. Then, not only the measured articulation angle between the truck and the trailer is known, but also, due to the change in the distance, the yaw rate of the trailer. Thus, the electromagnetic wave based measurement can be used to determine both, the measured articulation angle of the trailer and the yaw rate of the trailer. Therefore, only one sensor or one scanner unit is needed to determine both values.

Preferably, the scanner unit is a Lidar sensor. Lidar sensors are well suited for this application. The accuracy in range measurement provided by the Lidar sensor may be improved compared to conventional Radar sensors.

In one embodiment the method may further comprise the steps: providing a plurality of measurement points along a side portion of the trailer; and selecting for the distance measurement the measurement point having the least distance to the scanner unit. A plurality of measurement points can be beneficial, when the type of the trailer is not yet known and also for approving the quality of the measurement.

In a further preferred development of the step of providing or obtaining a length estimation of the trailer comprises the steps: determining a transversal velocity of the trailer; determining a yaw rate of the trailer; and determining a trailer distance between a king pin of the trailer and a rear axle of the trailer based on the traversal velocity of the trailer and the yaw rate of the trailer. The distance between the king pin and the rear axle of the trailer is the distance which substantially defines the kinematic behavior of the trailer during any turn maneuver.

This embodiment is based on the idea that it is desired to determine the length of the trailer without actually measuring it manually or by means of distance measurement sensors, but rather based on values which are easy determinable or measurable with known sensor equipment. The distance between the king pin and the rear axle of the trailer can be determined by dividing the transversal velocity of the trailer by the yaw rate of the trailer. The transversal velocity of the trailer is the actual velocity of the center of the rear axle of the trailer, in the longitudinal direction of the trailer. When the road train drives in a straight direction without any turn maneuver, the transversal velocity of the trailer is identical to the transversal velocity of the truck. However, during a turn maneuver, the transversal velocity of the truck will be different from the transversal velocity of the trailer.

On the one hand these values could be determined using sensors mounted to the trailer and based on these sensor values, the distance between the king pin and the rear axle of the trailer can be determined. On the other hand it is also possible to calculate these values based on sensors mounted to the truck alone, which is preferred. It is preferred that the system, which is used for carrying out the method, is self-sufficiently mounted to the truck and does not need any particular sensors, devices or other modifications at the trailer. This makes it possible that the truck might tow any trailer and still the trailer length could be estimated.

Preferably, the method further comprises: comparing the determined trailer distance with a pre-determined and pre-stored database of known trailer distances of known trailer types; selecting a known trailer type from a list based on the comparison; and obtaining the respective trailer length of the selected trailer type from the database. In practice, estimating the trailer length might be erroneous due to tire slip and other errors in the determination. Moreover, when the distance between the king pin and the center of the rear axle of the trailer is known, still the overall length of the trailer, which might extend beyond the rear axle of the trailer, is not known. Thus, it is preferred to compare the determined value with databases to obtain the overall length of the trailer. Such a database might be stored on a controller on board the truck of the road train, but might also be provided in a cloud service and a controller, which carries out the method connects to the cloud service to obtain access to the database.

The yaw rate of the trailer, which is used in the above defined calculation, may preferably be determined as follows: determining a yaw rate of the truck; and determining a theoretical articulation angle between the truck and the trailer. Based on these values, the trailer yaw rate can be determined iteratively in that the theoretical articulation angle is determined at different times and a difference between the current and the previous theoretical articulation angle is divided by the cycle time. This value is subtracted from the yaw rate of the truck and the result of this subtraction is an estimate of the trailer yaw rate. The yaw rate of the truck can be read out of control devices of the truck or determined using a specific sensor provided on the truck.

Also the transversal velocity of the trailer can be calculated. This can be done by determining the theoretical or measured articulation angle between the truck and the trailer; determining a longitudinal velocity of the king pin and determining a transversal velocity of the king pin. The longitudinal and transversal velocities of the king pin are measured in longitudinal and transversal direction of the truck and therefore are independent of the trailer. These velocities can be directly measured or obtained from truck systems, as e.g. acceleration sensors mounted in the truck. The longitudinal velocity of the trailer can then be calculated by applying theoretical or measured articulation angle between the truck and the trailer to the transversal longitudinal velocity values of the king pin.

It is also preferred to determine the theoretical articulation angle iteratively with a cycle time. This means, when the theoretical articulation angle is known at a certain time, the current theoretical articulation angle can be calculated using the previous theoretical articulation angle and adding the difference between the truck yaw rate and the trailer yaw rate multiplied by the cycle time. This is particularly beneficial when the yaw rate of the trailer is determined using a yaw rate sensor in the trailer. In this embodiment it is easy to determine the two yaw rates and therefore it is easy to calculate the theoretical articulation angle.

According to a second aspect, a computer program is provided comprising instructions which, when the program is executed by a computer, cause the computer to carry out the steps: loading a kinematic model of the road train; determining or obtaining a length estimation of the trailer; measuring an articulation angle between the truck and the trailer; and determining a position of the trailer relative to the truck using the kinematic model; the length estimation and the articulation angle.

In a third aspect, a control unit for a road train is provided, the control unit comprising: a memory with the computer program according to the second aspect stored thereon; and a processor configured to execute the computer program.

Preferably, the control unit comprises the interface for communicating with an internal BUS system of the road train and to receive distance measurement data from a scanner unit measuring a distance between a side portion of the truck, in particular a co-driver side of the truck and a measurement point at a side portion of the trailer.

Moreover, it is preferred that the control unit comprises an interface for communicating with an internal BUS-system of the road train for providing trailer position estimation data to a turn assist safety system of the road train. The turn assist safety system can then use the provided trailer position estimating for calculating and/or determining warning signals to be output to a driver, or also to execute an autonomous braking maneuver.

A road train 1 comprises a truck 2 and a trailer 4, wherein the trailer 4 is connected to the truck 2 via the king pin KP.

In FIG. 1 the trailer distance d is shown which is the distance between the king pin and a rear axle 30 of the trailer 4. In FIG. 1 the middle axis of three rear axle is chosen as the rear axle 30. The overall trailer length TL can be larger than the trailer distance d.

The idea of the present disclosure is to estimate a position of the trailer 4 relative to the truck 2 by providing or obtaining a kinematic model 3 of the road train 1; providing or obtaining a length estimation TL of the trailer 4; measuring an articulation angle m$\theta$ between the truck 2 and the trailer 4 and determining a position of the trailer 4 relative to the truck 2 using the kinematic model 3, the length estimation TL and the measured articulation angle m$\theta$. In particular, the present method uses the kinematic model 3, preferably an electromagnetic wave based measurement 38 for measuring the articulation angle m$\theta$ and an estimator module 40 which uses both information, the kinematic model 3 and the electromagnetic wave based measurement result, i.e. the measured articulation angle m$\theta$ to estimate the trailer position.

For estimating the trailer position, it is important to know the trailer length TL or at least the trailer distance D.

The truck 2 comprises in this embodiment a Lidar sensor 5 which forms a scanner unit 6 for electromagnetic wave based measurement 38. Inside the truck 2 moreover a control unit 12 is provided as well as a turn assist safety system 14. The turn assist safety system 14 is not a required part of the present invention, however the control unit 12 is used to provide the turn assist safety system 14 with data which may then be used by the turn assist safety system 14 to provide the driver of the road train 1 with a warning signal, and/or to carry out an autonomous braking maneuver.

The data which in the present disclosure is provided from the control unit 12 to the turn assist safety system 14 in particular is the trailer length TL and/or the trailer distance D which is determined or estimated as described below as well as a trailer position in X- and Y-coordinates as described below.

The control unit 12 in the present embodiment comprises a memory 15 on which a computer program 17 is stored. Moreover, the control unit 12 comprises a processor 19 which may execute the computer program 17 stored in the memory 15.

The control unit 12 comprises a first interface 22 and a second interface 24. Via the first interface 22 the control unit 12 is connected to a BUS 26 which in turn is connected to the Lidar sensor 5. The second interface 24 is connected to a second BUS 28, which is in turn connected to the turn assist safety system 14.

As will be appreciated by those skilled in the art, the trailer length TL is a crucial information when estimating whether the trailer 4 will collide with an object during a turn maneuver. The trailer length TL might be the overall length of the trailer 4. The trailer length TL might also be the distance D between the king pin KP and a rear axle 30 of the trailer 4, as this length in particular influences turning behavior of the trailer 4. The trailer length TL also is an important parameter when estimating the trailer position.

Figure 3B:
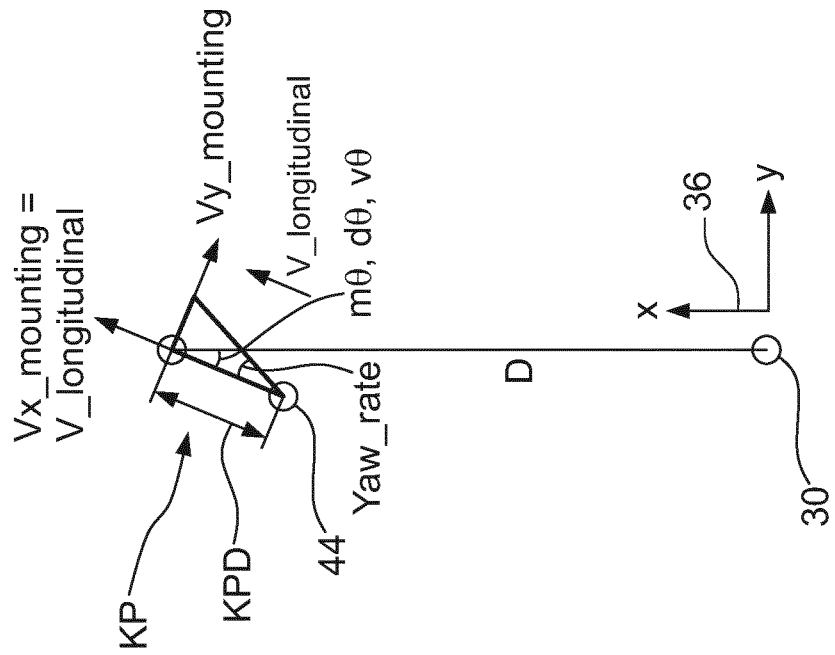
FIG. 3b shows a kinematic model of the road train.
Figure 3A:
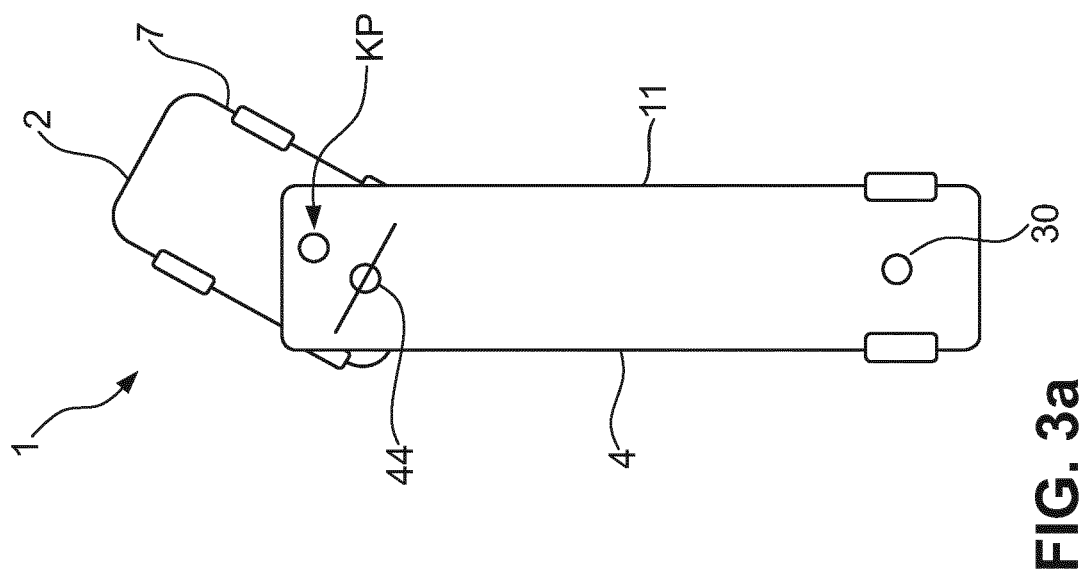
FIG. 3a shows a further schematic overview over the road train.
Figure 4:
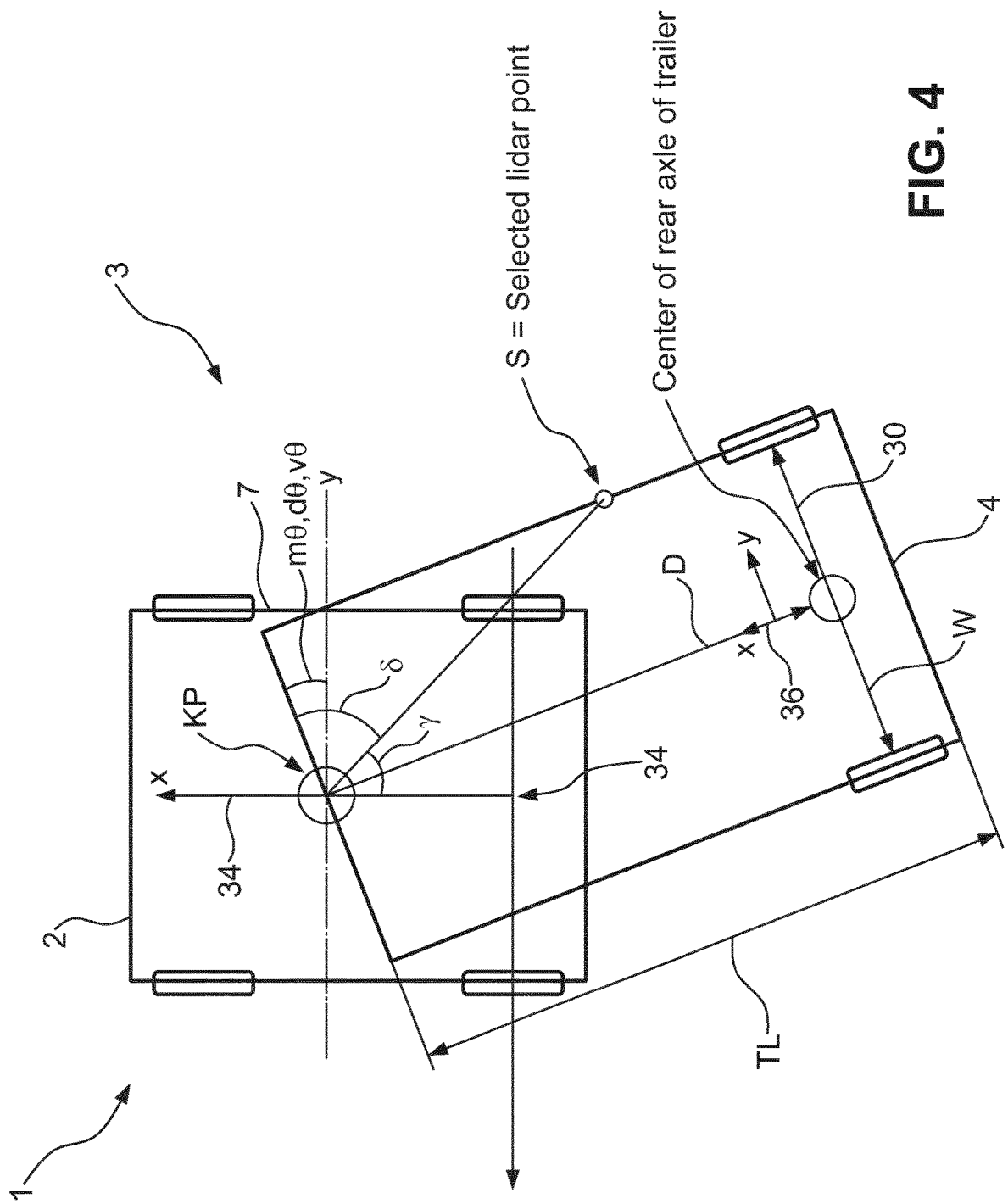
FIG. 4 shows further details of the kinematic model of the road train.

FIGS. 3a and 4 in particular show graphical representations of a kinematic model 3 of the road train 1. For estimating the trailer length TL in a first step, a trailer distance D which is the length between the king pin KP and the rear axle 30 of the trailer 4, is determined. The trailer distance D can best be seen in FIGS. 1, 3b and 4. The present disclosure is based on the idea that this trailer distance D is not measured using a manual measurement, but is estimated based on the kinematic model 3 and other sensors which might be provided in the truck 2, but without any sensors mounted on the trailer 4.

To determine the trailer distance D between the king pin KP and the rear axle 30 of the trailer 4, first the transversal velocity Vy_trailer of the trailer 4 and a yaw rate trailer_yaw_rate of the trailer 4 are determined. The transversal velocity Vy_trailer of the trailer 4 is the velocity transverse to a longitudinal direction of the trailer 4 which is the direction of the distance d between the king pin KP and the rear axle 30.

For all calculation a standard assumption must be made:

Velocity/radius=yawrate.

The distance D between the king pin KP and the rear axle 30 can be calculated as follows:

$$D = (V_{y\_trailer})/(trailer\_yaw\_rate) \quad (1)$$

Both, the transversal velocity Vy_trailer of the trailer 4 and also the trailer yaw rate trailer_yaw_rate of the trailer 4 could be determined using specific sensors mounted on the trailer 4. However, the present disclosure provides is to calculate these values, so that the method disclosed herein is also applicably for trailers 4 which are not provided with specific sensors.

Figure 2:
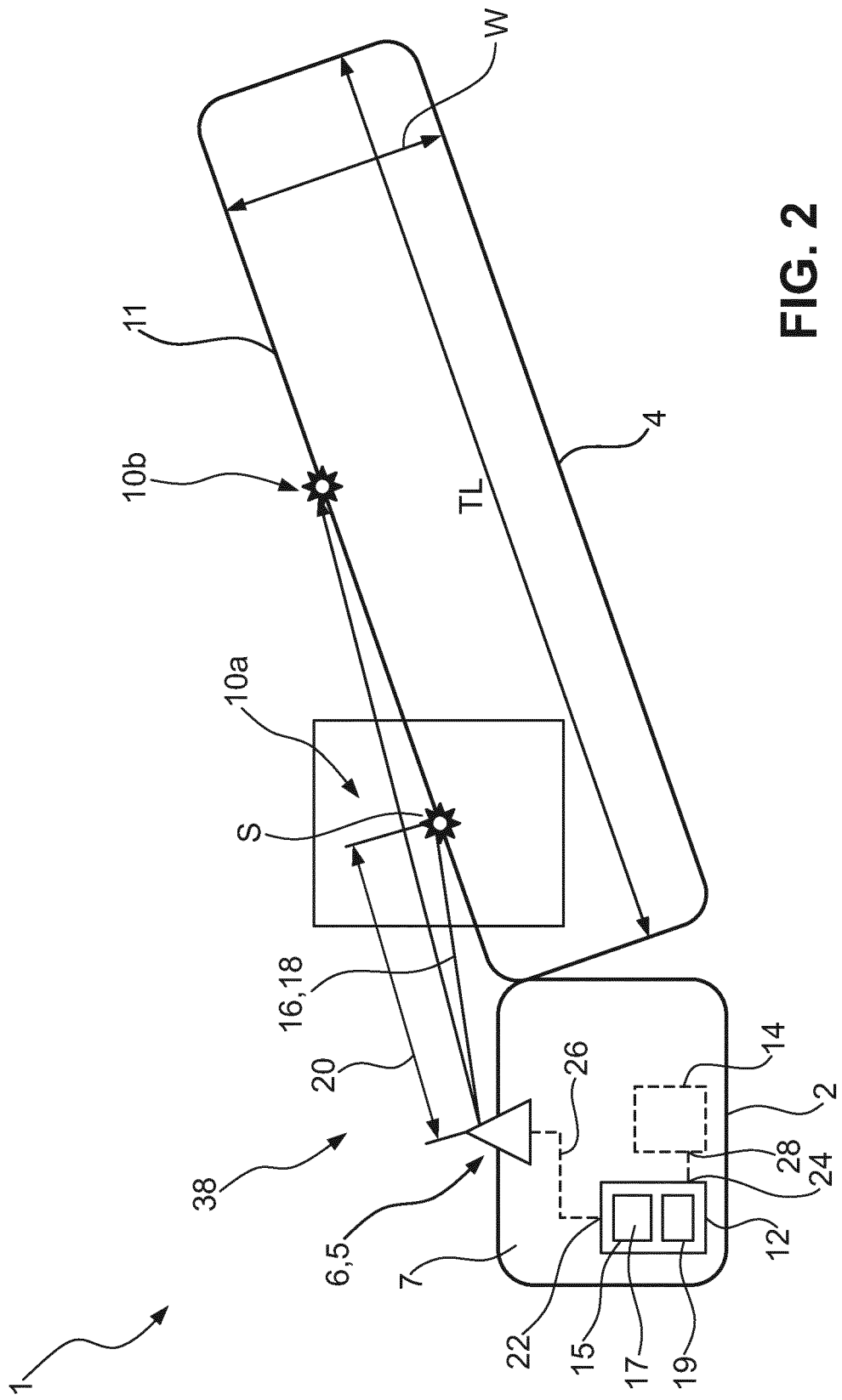
FIG. 2 shows a schematic overview over the road train.

The yaw rate trailer_yaw_rate of the trailer 4 can be calculated based on the yaw rate yaw_rate of the truck 2 and an articulation angle θ (mθ, dθ, vθ) between the truck 2 and the trailer 4 (see FIGS. 3 and 2b). Dependent on how the articulation angle is obtained in the present disclosure it is referred to mθ, dθ, vθ, wherein mθ is the articulation angle obtained based on a measurement, dθ is the articulation angle obtained in a theoretical way, and vθ is a verified articulation angle. When general statements are made which relate to any articulation angle, the reference θ is used only.

The articulation angle θ basically is the angle between a coordinate system 34 of the truck 2 and a coordinate system 36 of the trailer 4 (see FIG. 2b). The yaw rate trailer_yaw_rate of the trailer 4 can then be calculated as follows:

$$trailer\_yaw\_rate = yaw\_rate - ((\theta(current) - \theta(previous))/(CycleTime) \quad (2)$$

In equation (2), two different articulation angles θ are used, namely a previous articulation angle θ(previous) and the current articulation angle θ(current). A CycleTime is the time between the measurement or a calculation between these two articulation angles θ.

On the one hand the articulation angle θ can be determined iteratively using numerical methods, which are carried out by the processor 19 of the control unit 12. An equation for iterative determination of the theoretical articulation angle dθ is:

$$d\theta(updated) = d\theta(previous) + (yaw\_rate - trailer\_yaw\_rate) * CycleTime \quad (3)$$

In equation (3) the CycleTime and the yaw rate yaw_rate of the truck 2 are known, due to yaw rate sensors of the truck 2. Thus, using the numerical method it is possible to estimate or determine the theoretical articulation angle dθ.

However, preferably, in addition or alternatively, the articulation angle θ is measured using an electromagnetic wave based measurement 38. The measured articulation angle is referred to as mθ. The electromagnetic wave based measurement 38 preferably involves the Lidar sensor 5 which is connected to the control unit 12. The Lidar sensor 5 is mounted on a side portion 7 of the truck 2, in particular preferably on the co-driver's side, as the co-driver's side usually is the side of the road train 1 which is more vulnerable for collisions with objects or other vulnerable road users.

The Lidar sensor 5 emits a light beam 16 to preferably a plurality of measurement points 10a, 10b on a side portion 11 of the trailer 4. Out of these measurement points 10a, 10b the closest one S is selected and forms the selected measurement point S. In other embodiments it might also be provided that any of the other measurement points 10a, 10b is selected. Even though in FIG. 1 only two measurement points 10a, 10b are shown, it shall be understood that also a larger number of measurement points can be provided. This is beneficial, since not each part of every trailer reflects the radiation properly and therefore different measurements might be carried out to improve the quality of the method.

The Lidar sensor 5 is adapted to receive the reflected beam 18 and determine the distance 20 between the Lidar sensor 5 and the selected measurement point S based on a runtime measurement of the reflected beam 18.

Now it is assumed that the trailer width W is known, as this width normally is standardized or the variations in width W of a trailer 4 are small compared to the length of the trailer TL.

From FIG. 4 the geometric relationships between the selected measurement point S and the center of the rear axle 30 of the trailer 4 can be seen. The position of the king pin KP relative to the truck coordinate system 34 is known. From the run time measurement carried out with the Lidar sensor 5 also the position of the selected measurement point S is known (see FIG. 4). Thus, the distance between the king pin KP and the selected measurement point S can be determined. Also known is angle δ, which is the angle between the line connecting king pin KP and the selected measurement point S and a flat front face of the trailer 4 which equals a plane perpendicular to the longitudinal direction of the trailer 4. From the geometric relationship it becomes apparent that:

$$\delta = \arccos(W/(2*(distance\ between\ KP\ and\ S))) \quad (4)$$

Now, still angle γ is needed which is the angle between the X direction of the truck coordinate system 34 and the X direction of the trailer coordinate system 36. From the geometric relationships in FIG. 4 it can be determined that:

$$\gamma = \arctan(Yposition\ of\ S/Xposition\ of\ S) \quad (5),$$

wherein the X and Y positions of the selected measurement point S are given in the truck coordinate system 34.

From equations (4) and (5) now the measured articulation angle mθ can be determined which is:

$$\theta = \delta + \gamma - \pi/2 \tag{6}$$

Thus, the measured articulation angle mθ can be calculated based on the electromagnetic wave based measurement 38 carried out using the Lidar sensor 5.

Based on this electromagnetic wave based measurement 38, also the yaw rate trailer_yaw_rate of the trailer 4 can be calculated. To achieve this, the measurement of the measured articulation angle mθ is carried out at a second time and the change of the articulation angle in this time is determined. This can be done by the following equation:

$$\text{trailer\_yaw\_rate} = m\theta(t1) - m\theta(t0)/t1 - t0 \tag{7}$$

The measured articulation angle mθ and the yaw rate trailer_yaw_rate of the trailer 4 can be directly used, or can be used to verify the respective calculated values which might be calculated iteratively using numerical methods.

Using all the above definitions, the trailer distance D between the king pin KP and the rear axle 30 of the trailer 4 can be calculated.

Figure 6:
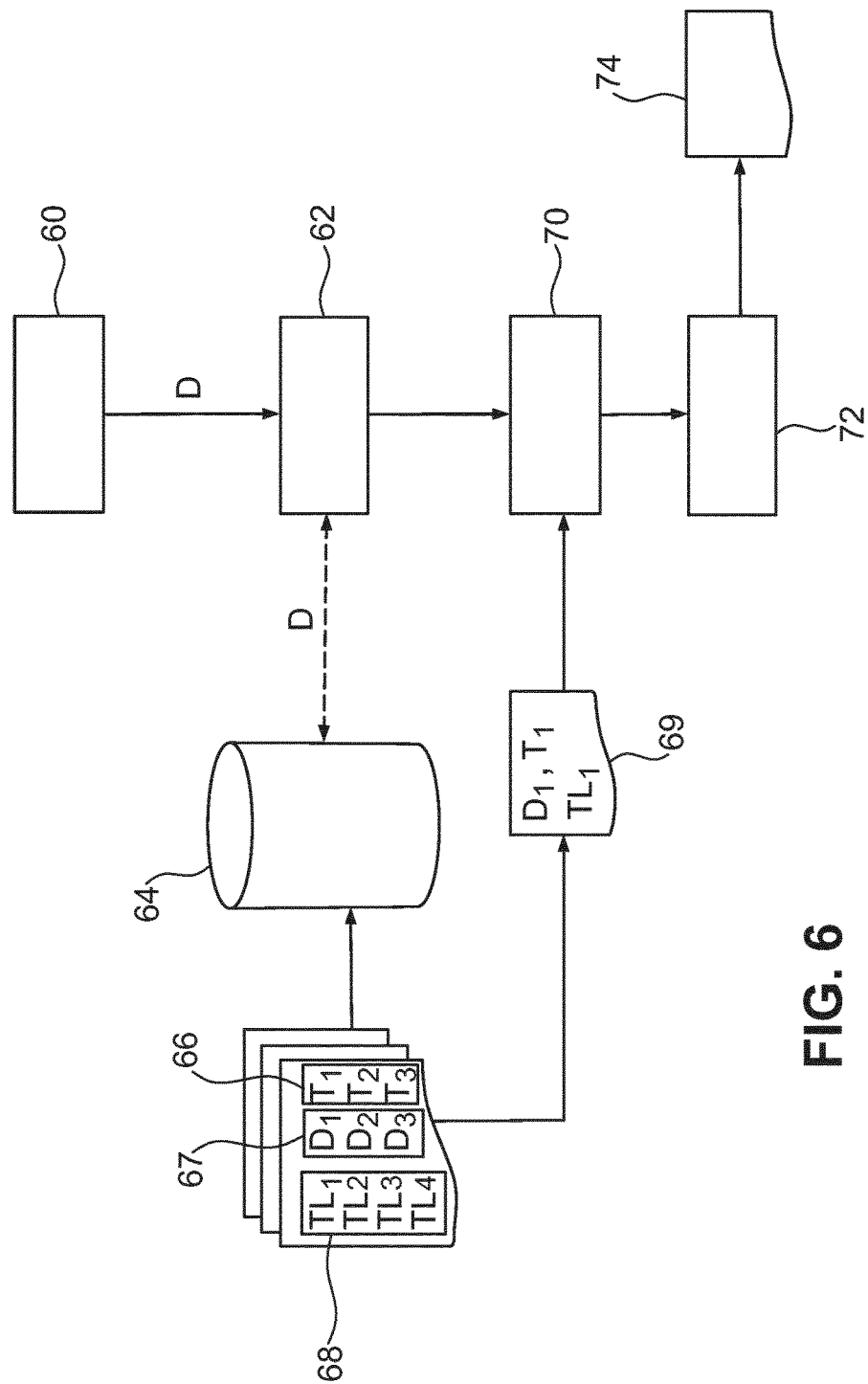
FIG. 6 provides a flow chart for a method of estimating a position of a trailer relative to a truck of a road train.

The actual trailer length TL then preferably is determined from a database which includes a plurality of pre-stored trailer lengths of known trailer types. This process is illustrated in FIG. 6. After the determined trailer distance D has been determined in step 60 (which may include all the above described steps), the control unit 12 or any other suitable unit may access in step 62 a database 64. The database 64 may be stored within memory 15 or on a separate storage or may be accessed in a wireless way and may for example stored in a cloud service. The database 64 comprises trailer type data 66 comprising known trailer types T1, T2, T3, etc., trailer distance data 67 having respective known trailer distances D1, D2, D3, etc. of these known trailer types T1, T2, T3, etc., and respective trailer length data 68 having known trailer length TL1, TL2, TL3, etc. of these known trailer types T1, T2, T3, etc. Also in step 62, the determined trailer distance D is compared to the known trailer distances D1, D2, D3, etc. of the trailer distance data 67. Based on this comparison a matching known trailer type T1, T2, T3, etc. may be determined from the trailer type data 66. Usually the matching known trailer type T1, T2, T3, etc. would be the trailer type T1, T2, T3, etc. having a trailer distance D1, D2, D3, etc. which is closest to the determined trailer distance D. A dataset 69 is selected with the matching trailer distance, in this example trailer distance D1, the respective trailer type T1 and the respective trailer length TL1. This dataset 69 is received in step 70. In step 72 the dataset 69 or only trailer length data 74 may be provided to a module or system of the truck 1, as e.g. the turn assist safety system (14).

When the trailer distance D is known and the theoretically calculated articulation angle dθ has been verified using the measured articulation angle mθ, the verified articulation angle vθ can be used to determine the trailer position in the coordinate system 34 of the truck 2. This can be done as follows:

The standard positions in X and Y directions measured in the truck coordinate system 34 can then be calculated using the following equations:

$$\text{trailer position\_}x = \cosines(v\theta) * D - KPD \tag{8}$$

$$\text{trailer position\_}y = \sinus(v\theta) * D \tag{9}$$

In the above equation (8) parameter KPD identifies the distance between the king pin KP and a rear axle 44 of the truck 2.

The information regarding the trailer position can then be used by the turn assist safety system 14 to determine whether the trailer 2 might collide with an object or a person in a turn maneuver or to improve safety of the road train 1 via other measures.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1 road train
2 truck
3 Kinematic model
4 trailer
5 Lidar Sensor
6 scanner unit
7 side portion of the truck
10a, 10b measurement points
11 side portion of the trailer
12 control unit
14 turn assist safety system
15 memory
16 beam from a scanner unit
17 computer programm
18 reflected beam
19 processor
20 point
22 interface
24 second interface
26, 28 internal BUS-system
30 rear axle
34 coordinate system truck
36 coordinate system trailer
38 electromagnetic wave based measurement
40 Estimator module 44 rear axle of truck
60 Step of determining distance
62 Step of accessing database
64 Database
66 Trailer type data
67 Trailer distance data
68 Trailer length data
69 Selected dataset
70 Step of receiving
72 Step of providing trailer length data
74 Trailer length data
TL trailer length
V_longitudinal Velocity of the truck
Vy_trailer transversal velocity of the trailer
trailer_yaw_rate yaw rate of the trailer
D trailer distance
KP king pin
KPD Distance between KP and 44
vθ articulation angle
dθ theoretical articulation angle
mθ measured articulation angle
vθ verified articulation angle
Vx_mounting longitudinal velocity of the king pin
Vy_mounting transversal velocity of the king pin
CycleTime cycle time
S selected measurement point
W trailer width
X longitudinal direction
Y transversal direction
γ angle
δ angle

The invention claimed is:

1. A method for estimating a position of a trailer relative to a truck of a road train, the method comprising:
   providing or obtaining a kinematic model of the road train;
   providing or obtaining a length estimation of the trailer;
   measuring an articulation angle between the truck and the trailer by emitting an electromagnetic wave towards a measurement point, receiving a reflected electromagnetic wave from the measurement point to a sensor, and receiving one or more signals transmitted from the sensor;
   determining a position of the trailer relative to the truck using the kinematic model, the length estimation and the measured articulation angle,
   determining a theoretical articulation angle between the truck using the kinematic model;
   comparing the theoretical articulation angle and the measured articulation angle; and
   correcting the theoretical articulation angle to obtain a verified articulation angle when the measured articulation angle is not within a predetermined tolerance range for the theoretical articulation angle.

2. The method according to claim 1, further comprising the steps:
   obtaining a velocity of the truck, a yaw rate of the truck, and a position of a king pin of the truck;
   wherein the step of determining a position of the trailer relative to the truck is also based on the velocity of the truck, the yaw rate of the truck, and the position of the king pin of the truck.

3. The method according to claim 1, wherein the step of measuring the articulation angle between the truck and the trailer is carried out using an electromagnetic wave based measurement between the truck and the trailer.

4. The method according to claim 3, wherein the electromagnetic wave based measurement comprises, at a first time:
   sending a beam from a scanner from a side portion of the truck to a measurement point at a side portion of the trailer;
   receiving, at the scanner, a reflected beam;
   determining the distance between the scanner and the measurement point based on a runtime measurement of the reflected beam.

5. The method according to claim 4, comprising:
   repeating the steps of claim 4 at a second time; and
   determining the yaw rate of the trailer based on the change in distance from the first time to the second time.

6. The method according to claim 4, wherein the scanner is a Lidar-Sensor.

7. The method according to claim 4, further comprising:
   providing a plurality of measurement points along the side portion of the trailer; and
   selecting, for the step of determining the distance between the scanner and the measurement point, a measurement point of the plurality of measurement points that is closest to the scanner.

8. The method according to claim 1, wherein providing or obtaining a length estimation of the trailer comprises:
   determining a transversal velocity of the trailer;
   determining a yaw rate of the trailer; and
   determining the trailer distance between a king pin of the trailer and a rear axle of the trailer based on the transversal velocity of the trailer and the yaw rate of the trailer.

9. The method according to claim 8, further comprising:
   comparing the determined trailer distance with a pre-determined and pre-stored database of known trailer distances of known trailer types;
   selecting a known trailer type from a list based on the comparison; and
   obtaining the respective trailer length of the selected trailer type from the database.

10. The method according to claim 1, wherein determining the theoretical articulation angle between the truck and the trailer using the kinematic model, comprises:
    iteratively determining the theoretical articulation angle with a cycle time.

11. The method of claim 1, comprising the step:
    determining the theoretical articulation angle based on the yaw rate of the truck and the yaw rate of the trailer.

12. A non-transitory computer-readable medium having processor-executable instructions stored thereon, wherein the processor-executable instructions, when executed by one or more processors, facilitate performance of a method for estimating a position of a trailer relative to a truck of a road train, the method comprising:
    loading a kinematic model of the road train;
    determining or obtaining a length estimation of the trailer;
    measuring an articulation angle between the truck and the trailer by emitting an electromagnetic wave towards a measurement point, receiving a reflected electromagnetic wave from the measurement point to a sensor, and receiving one or more signals transmitted from the sensor;
    determining a position of the trailer relative to the truck using the kinematic model, the length estimation and the articulation angle,
    determining a theoretical articulation angle between the truck using the kinematic model;

comparing the theoretical articulation angle and the measured articulation angle; and correcting the theoretical articulation angle to obtain a verified articulation angle when the measured articulation angle is not within a predetermined tolerance range for the theoretical articulation angle.

13. A control unit for a road train, the control unit comprising:

a memory having stored thereon the computer program of claim 12; and a processor configured to execute the computer program.

14. The control unit of claim 13, further comprising an interface configured to communicate with an internal BUS-system of the road train and to receive distance measurement data from a scanner measuring a distance between a side portion of the truck, and a measurement point at a side portion of the trailer.

15. The control unit of claim 13, further comprising an interface configured to communicate with an internal BUS-system of the road train for providing trailer position estimation data to a turn assist safety system of the road train.

* * * * *